United States Patent [19]

Nakayama et al.

[11] Patent Number: 5,515,228
[45] Date of Patent: May 7, 1996

[54] PORTABLE TERMINAL UNIT WITH A DUAL PURPOSE EXTERNAL CONNECTION

[75] Inventors: Toshiharu Nakayama; Tateo Masaki, both of Chiba, Japan

[73] Assignee: Uniden Corporation, Chiba, Japan

[21] Appl. No.: 149,360

[22] Filed: Nov. 9, 1993

[30] Foreign Application Priority Data

Nov. 19, 1992 [JP] Japan .................................. 4-309115

[51] Int. Cl.⁶ ...................................................... H02H 3/14
[52] U.S. Cl. ................... 361/88; 340/310.06; 340/311.1; 455/89; 455/117; 455/217
[58] Field of Search ......................... 340/310.01, 310.06, 340/311.1, 825.44; 455/38.3, 89, 117, 127, 217, 351; 379/55, 322; 320/10–14

[56] References Cited

U.S. PATENT DOCUMENTS 4,857,884 8/1989 O'Malley et al. .................... 340/311.1

FOREIGN PATENT DOCUMENTS 63-114428 5/1988 Japan .

OTHER PUBLICATIONS

Uniden, Challenge for Excellence brochure. (no date).

Primary Examiner—A. D. Pellinen
Assistant Examiner—Michael J. Sherry
Attorney, Agent, or Firm—Lowe, Price, LeBlanc & Becker

[57] ABSTRACT

In portable terminal units each of which has a rechargeable battery and a data processing section, one terminal is used as both a terminal for charging the rechargeable battery and a terminal for connecting a data processing unit to an external data processing unit. First protective circuitry protects the data processing unit from a battery charging current and second protective circuitry eliminates loading of the rechargeable battery due to a data voltage and protects the external data processing unit from charging current for the chargeable battery.

9 Claims, 4 Drawing Sheets 5,515,228

PORTABLE TERMINAL UNIT WITH A DUAL PURPOSE EXTERNAL CONNECTION

FIELD OF THE INVENTION

This invention relates to portable terminal units, such as a pager or a portable telephone, which have been getting more and more compact, and more particularly to portable terminal units in which one terminal is used as both a data terminal and a charging terminal.

BACKGROUND OF THE INVENTION

Recent portable terminal units such as pagers (radio call receiver) or portable telephone have been becoming more and more compact and also the functions have been expanded. For this reason, units each having a dedicated data terminal have been proposed to write data in the portable terminal units from outside as well as to take out data from the portable terminal units to outside. Also in the portable terminal units as described above is generally incorporated a chargeable battery (for instance, a Ni-Cd battery: a is chargeable nickel-cadmium battery in which nickel is used for anode and cadmium for cathode) and is also included a charging terminal.

However, in the conventional types of portable terminal units as described above, a dedicated data terminal is provided in addition to a charging terminal, which makes it difficult to minimize a size of portable terminal units and causes cost increase and also limits a freedom in designing portable terminal units.

SUMMARY OF THE INVENTION

It is an object of the invention to provide a portable terminal unit in which more compact portable terminal units is realized and a freedom in designing is expanded without causing cost increase by using one terminal as both a data terminal and a charging terminal.

According to the invention, there is provided a portable terminal unit incorporating a chargeable battery and a data processing section and comprising one common terminal which can be used as both a terminal for charging the chargeable battery and a terminal for connecting the data processing section to an external data processing unit, first protective means which is inserted into a data line between the common terminal and the data processing section and protects the data processing sections from a charging current, and second protective means which is inserted into a charging line between the common terminal and the chargeable battery, eliminates a load to the chargeable battery due to data voltage, and also protects the external data processing unit from a charging current from the chargeable battery; wherein the first protective means becomes a data line when the external data processing unit is connected to the common terminal and the second protective means becomes a charging line when a battery charger is connected to the common terminal.

Also the first protecting means has at least a circuit to prevent a charging current. And the circuit for preventing a charging current comprises a diode.

Further, the first protective means comprises a diode to prevent a charging current, a data input buffer connected to the diode, and a pull-up resistor connected to a power line to pull up a voltage at a contact between the diode and the data input buffer.

Furthermore the first protecting means comprises a diode to prevent a charging current, a data input buffer connected to the diode, a pull-up resistor connected to a power line to pull up a voltage at a contact between the diode and the data input buffer, and a data output transistor connected to the contact above.

And the second protective means has a circuit to drop the data voltage so that the data voltage will not become a load to the chargeable battery as well as to drop a charging voltage so that the charging voltage will not become a load to the external data processing unit.

Also the circuit to drop the voltage comprises a serial circuit comprising one or more diodes. And the circuit to drop the voltage comprises a serial circuit comprising a diode and a Zener diode. And also the circuit to drop the voltage comprises a serial circuit comprising a diode and a resistor.

In the portable terminal units according to the present invention which incorporates a chargeable battery and a data processing section, one terminal is used as both a terminal for charging the chargeable battery and a terminal for connecting the data processing unit to an external data processing unit, first protective means for protecting the data processing unit from a charging current is inserted into a data line, and also second protective means for eliminating a load to the chargeable battery due to a data voltage, and for protecting the external data processing unit from a charging current from the chargeable battery, so that the first protective means becomes a data line when the external data processing unit is connected to the common terminal and the second protective means becomes a line for charging when a battery charger is connected to the common terminal.

Other objects and features of this invention will become understood from the following description with reference to the accompanying drawings.

DESCRIPTION OF THE EMBODIMENTS

Figure 1:
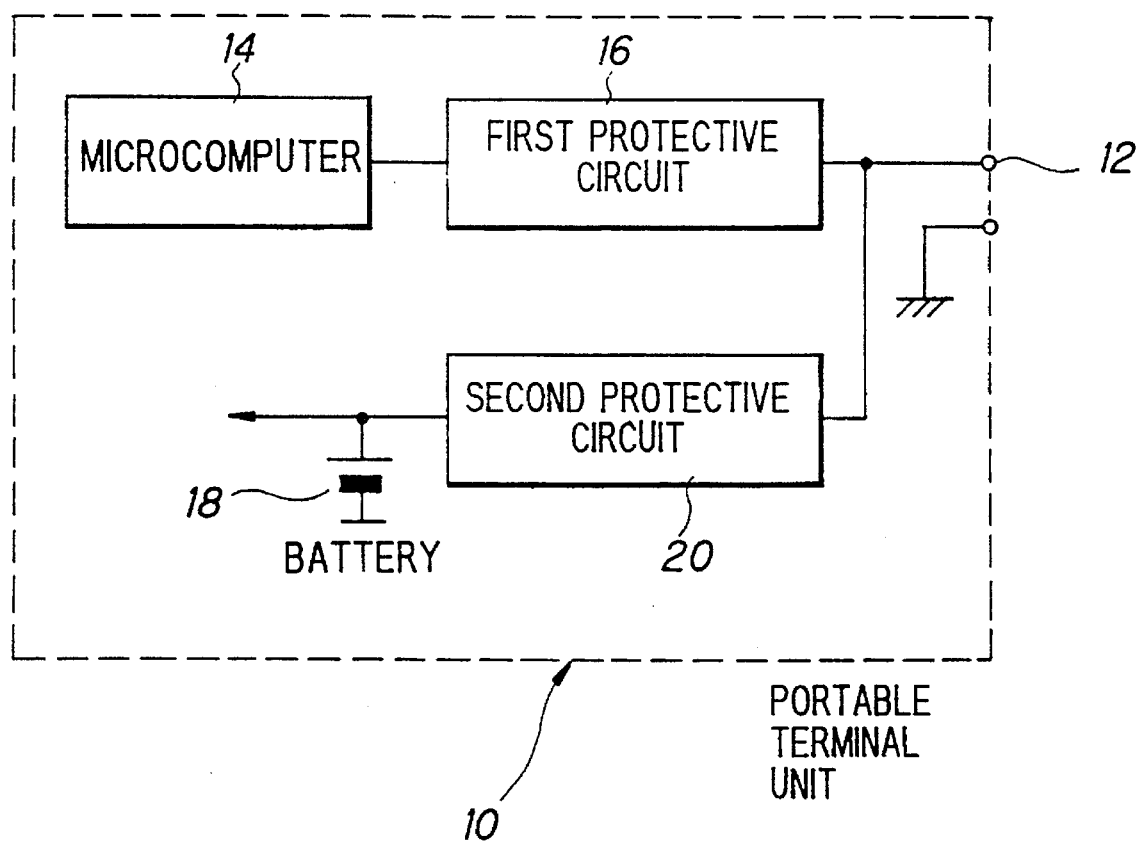
FIG. 1 is a block diagram illustrating general configuration of a portable terminal unit according to the present invention.

FIG. 1 is a block diagram illustrating general configuration of a portable terminal unit according to the present invention, and referring to this figure, a portable terminal unit 10 has one common terminal 12 which can be used as both a data terminal and a charging terminal. The common terminal 12 is connected via a first protective circuit 16 to a microcomputer 14 which is incorporated in the portable terminal unit 10, while the common terminal 12 is also connected via a second protective circuit 20 to a battery 18 incorporated in the portable terminal unit 10.

The first protective circuit 16 connects an external data input unit (not shown) to the common terminal 12 and allows data to pass through in the data line when executing data transaction with the microcomputer 14 incorporated in the portable terminal unit 10, however prevents data from passing through when a battery charger (not shown) is connected to the common terminal 12 to charge the battery 18 incorporated in the portable terminal unit 10.

On the other hand, the second protective circuit 20 allows a charging current to pass through when a battery charger is connected to the common terminal 12 to charge the battery 18 incorporated in the portable terminal unit 10, however prevents data signals from passing through when an external data input unit is connected to the common terminal 12 for executing data transaction with the microcomputer 14 incorporated in the portable terminal unit 10, and furthermore prevents a reverse charging current from the battery 18 to protect the external data input unit.

By providing the first protective circuit 16 and the second protective circuit 20, one common terminal 12 can be used as both a data terminal and a charging terminal.

Figure 2:
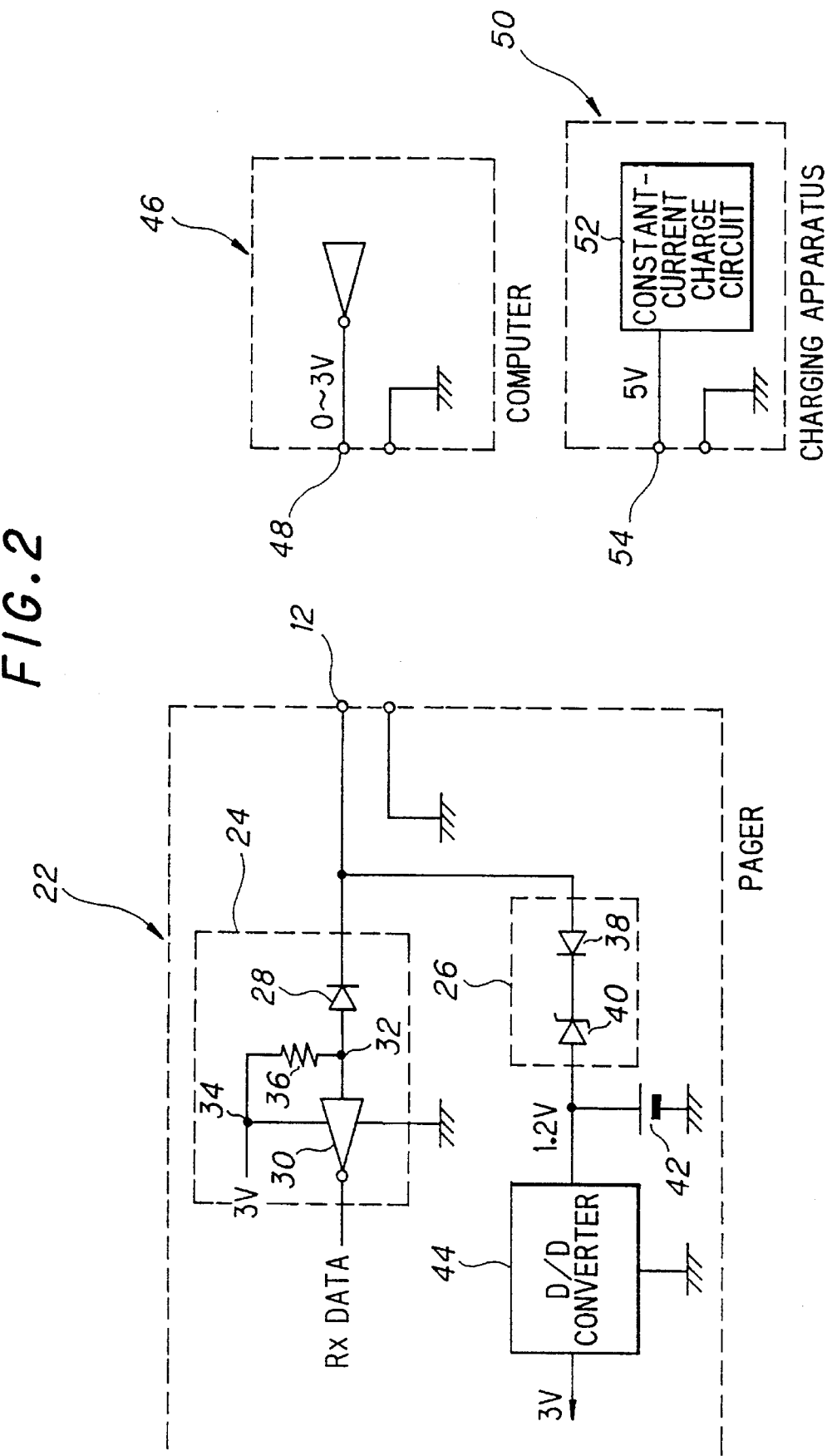
FIG. 2 is a circuit diagram illustrating configuration of a case where the portable terminal unit is a pager.

FIG. 2 shows a case where the portable terminal unit is a pager, and data can be inputted to a microcomputer (not shown) incorporated in a pager 22 from outside. The pager 22 has the common terminal 12, and a first protective circuit 24 and a second protective circuit 26 are connected to the common terminal 12 respectively.

The first protective circuit 24 comprises a diode 28, cathode of which is connected to the common terminal 12, a buffer 30 connected to anode of the diode 28, and a pull-up resistor 36 connected between a junction point 32 between the diode 28 and the buffer 30 and a 3 V power line. The buffer 30 is connected to the microcomputer.

On the other hand, the second protective circuit 26 comprises a diode 38, anode of which is connected to the common terminal 12, and a Zener diode 40, cathode of which is connected to cathode of the diode 38. Anode of the Zener diode 40 is connected to a battery 42 as well as to a D/D converter 44.

Next, description is made for operations assuming a case where the battery 42 is charged by connecting a charging terminal 54 of a charging apparatus 50 to the common terminal 12 of the pager 22 above. It should be noted that the charging apparatus 50 has a constant-current charge circuit 52 and the charging voltage is 5 V.

A charging current from the battery charger 50 passes through the common terminal 12 and is supplied via the diode 38 and the Zener diode 40 in the second protecting circuit 26 to the battery 42 for charging it. If it is assumed that the voltage drop in the diode 38 is 0.6 V and the Zener voltage in the Zener diode 40 is 3.2 V, a voltage loaded to the battery 42 is 1.2 V. A voltage of the battery 42 is converted to 3 V by a D/D convertor and is supplied as a power voltage for the circuit. On the other hand, the diode 28 in the first protective circuit 24 prevents a reverse charging current from the battery charger 50, so that the charging current does not flow into the data line.

Next, description is made for operations when data is inputted from a computer 46 by connecting a data output terminal 48 of the computer 46.

It is assumed that a data voltage from the computer 46 is 0 V for low level (L) and 3 V for high level (H). The diode 28 in the first protective circuit 24 turns ON when input data from the computer 46 is "L" and turns OFF when input data is on the contrary "H". For this reason, a level at the junction point 32 is "L" when input data is "L" and "H" when input data is "H". The buffer 30 outputs a level at the junction point 32 to the data line. Namely, data from the computer 46 is connected to the data line.

On the other hand, in the second protective circuit 26, as the voltage drops due to the diode 38 and the Zener diode 40, so that no voltage is loaded to the battery 42. In addition, because of the diode 38, the battery voltage gives no effect to the computer 46.

Figure 3:
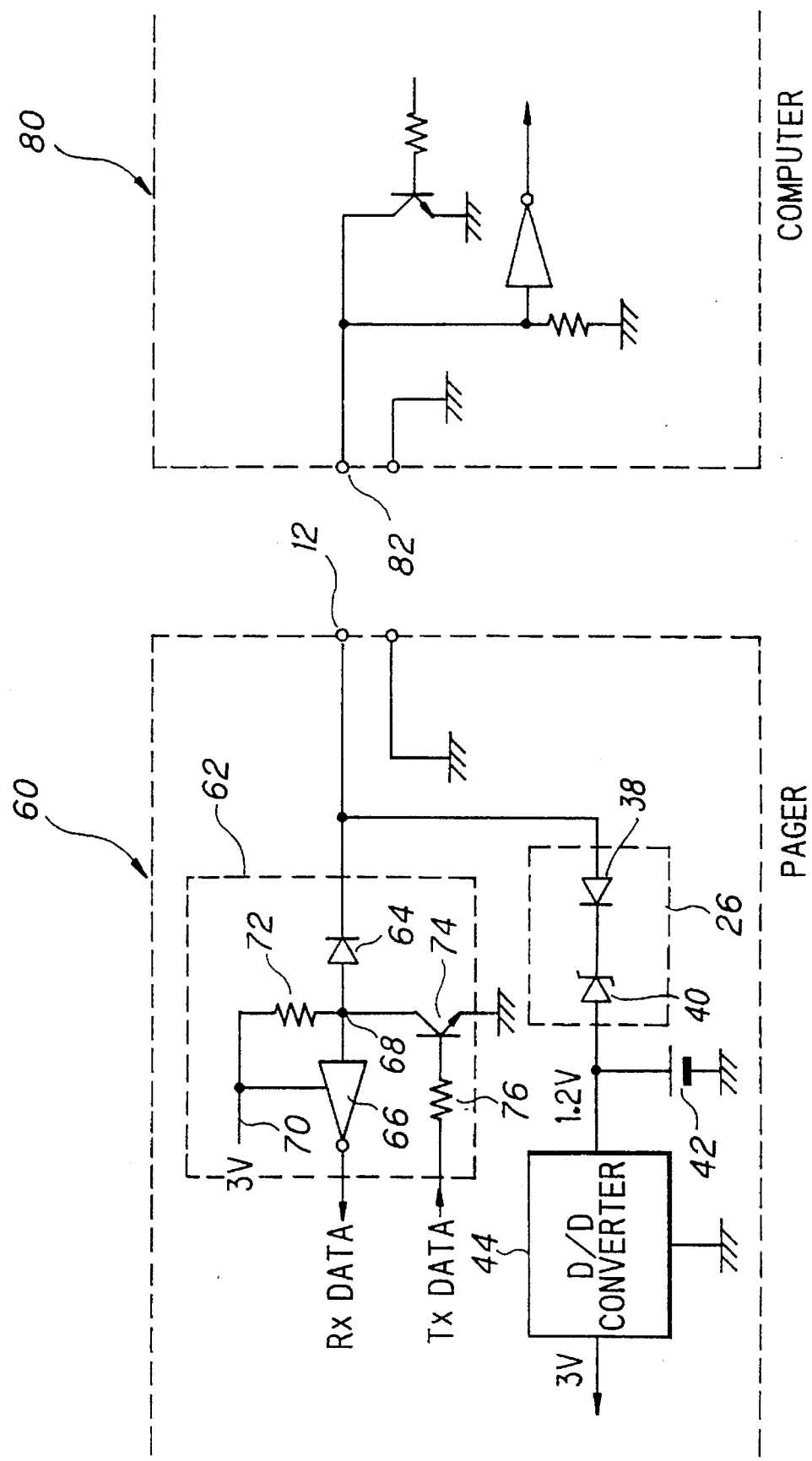
FIG. 3 is a circuit diagram illustrating a case where the portable terminal unit is a pager having another configuration.

FIG. 3 shows a case where the portable terminal unit is a pager having another configuration, and in this case data transaction can be executed between a microcomputer (not shown) incorporated in the unit and an external computer. This pager 60 has the common terminal 12, and a first protective circuit 62 and a second protective circuit 26 are connected to the common terminal 12 respectively. It should be noted that, as the second protective circuit 26 has the same configuration as that of the second protective circuit shown in FIG. 2, the same reference numeral is assigned to it and description for it is omitted herein.

The first protective circuit 62 comprises a diode 64, cathode of which is connected to the common terminal 12, a buffer 66 connected to anode of the diode 64, a pull-up resistor 72 connected to between a junction point 68 between the diode 64 and the buffer 66 and a 3-V power line, a transistor 74, collector of which is connected to the junction point 68, and a resistor 76 connected to a base of the transistor 74.

To this first protective circuit 62 is assigned, in addition to the functions of the first protective circuit 24 shown in FIG. 2, a function to connect Tx data for transmission to the common terminal 12.

Next, description is made for operations in a case where a data I/O terminal 82 of the computer 80 is connected to the common terminal 12 of the pager 60 and Tx data is outputted from a microcomputer (not shown) incorporated in the pager 60 to a computer 80. The transistor 74 turns ON when Tx data is "H" and OFF when Tx data is "L". For this reason, a level at the junction point 68 is "L" when Tx data is "H" and "H" when Tx data is "L". Accordingly, Tx data indicating a level at the junction point 68 is connected via the diode 64 to the common terminal 12.

Figure 4:
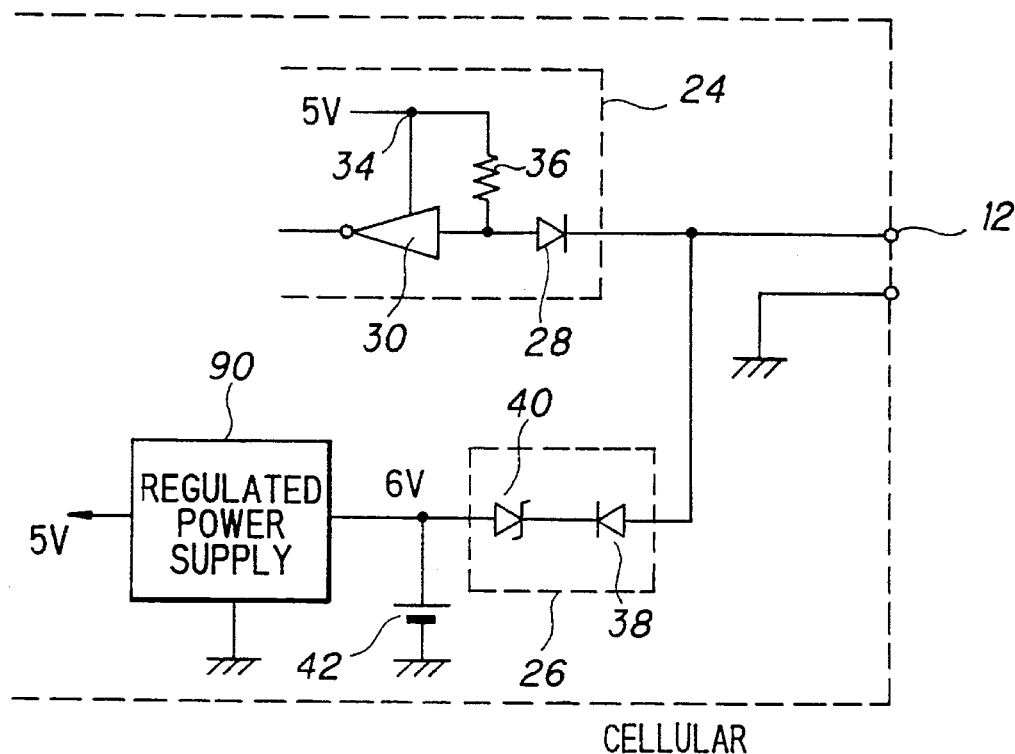
FIG. 4 is a circuit diagram illustrating a case where the portable terminal unit is cellular.

FIG. 4 is a case where the portable terminal unit is cellular, and this case is basically the same as the case of pager shown in FIG. 2, however in this case the voltage of the battery 42 is 6 V and a regulated power supply 90 to stabilize the 6 V voltage to 5 V is incorporated therein. In case of cellular, the power supply voltage in the inner circuit is 5 V, higher than that in case of pager, however like in case of pager, when a computer (not shown) is connected to the common terminal 12, data from the computer can be inputted into a microcomputer (not shown) incorporated in the cellular, and also when a battery charger (not shown) is connected to the common terminal 12, the battery 42 can be charged without giving any effect to the data line.

Figure 5A:
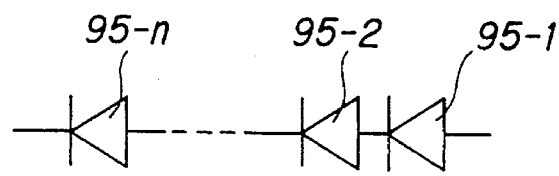
FIG. 5A and 5B are circuit diagrams illustrating another configuration of second protective means shown in FIG. 1.
Figure 5B:
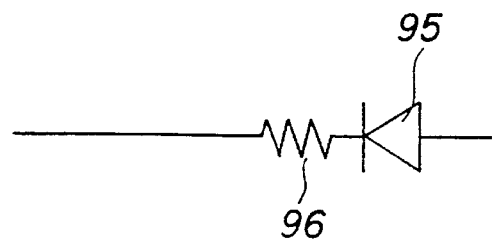

It should be noted that the present invention is not limited to the embodiments described above, and that various changes and modifications can be made within a scope of the present invention. For instance, the second protective circuit 26 may be a circuit in which a plurality of diodes 95-1 to 95-n are connected serially as shown in FIG. 5A or a circuit in which a resistor 96 and a diode 95 are connected serially as shown in FIG. 5B according to a voltage range.

As described above, in a portable terminal unit according to the present invention which has a chargeable battery and a data processing section, one terminal is used as both a terminal for charging the chargeable battery and a terminal for connecting the data processing section to an external data processing unit, the first protective means for protecting the data processing section from a charging current is inserted into the data line to eliminate load to the chargeable battery due to a data voltage, and also the second protective means for protecting the external data processing unit from a charging current for the chargeable battery is inserted into a charging line, so that the first protective means becomes a data line when an external data processing unit is connected to the common terminal and the second protective circuit becomes a charging line when a battery charger is connected to the common terminal, and for this reason it is possible to furthermore minimize portable terminal units as well as to expand a freedom in designing portable terminal units without causing cost increase.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A portable terminal unit, which incorporates a chargeable battery and a data processing section, comprising:
    one common terminal which can be used as both a terminal for charging said chargeable battery and a terminal for connecting said data processing section to an external data processing unit;
    first protective means in a data line between said common terminal and said data processing section and which protects said data processing section from a charging current; and
    second protective means in a charging line between said common terminal and said chargeable battery for eliminating load to said chargeable battery wherein said first protective means becomes a data line when said external data processing unit is connected to said common terminal and said second protective means becomes a charging line when a charging apparatus is connected to said common terminal.

2. A portable terminal unit according to claim 1, wherein said first protective means has at least a circuit to prevent a charging current.

3. A portable terminal unit according to claim 2, wherein said circuit to prevent a charging current comprises a diode.

4. A portable terminal unit according to claim 1, wherein said first protective means comprises a diode to prevent a charging current, a data input buffer connected to said diode, and a pull-up resistor connected to a power line to pull up a voltage at a junction point between said diode and said data input buffer.

5. A portable terminal unit according to claim 1, wherein said first protective means comprises a diode to prevent a charging current, a data input buffer connected to said diode, a pull-up resistor connected to a power line to pull up a voltage at a junction point between said diode and said data input buffer, and a data output transistor connected to said junction point.

6. A portable terminal unit according to claim 1, wherein said second protective means has a circuit to drop a data voltage so that said data voltage is not loaded to said chargeable battery and to drop a charging voltage so that said charging voltage is not loaded to said external data processing unit.

7. A portable terminal unit according to claim 6, wherein said circuit to drop said data voltage and charging voltage comprises a serial circuit comprising one or more diodes.

8. A portable terminal unit according to claim 6, wherein said circuit to drop said data voltage and charging voltage comprises a serial circuit comprising a diode and a Zener diode.

9. A portable terminal unit according to claim 6, wherein said circuit to drop said data voltage and charging voltage comprises a serial circuit comprising a diode and a resistor.

* * * * *